(12) United States Patent  
Kurashima

(10) Patent No.: US 7,364,446 B2
(45) Date of Patent: Apr. 29, 2008

(54) RELEASING MECHANISM OF PLUGGABLE TRANSCEIVER

(75) Inventor: Hiromi Kurashima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 546 days.

(21) Appl. No.: 11/117,695

(22) Filed: Apr. 29, 2005

(65) Prior Publication Data
US 2006/0245759 A1 Nov. 2, 2006

Related U.S. Application Data

(60) Provisional application No. 60/566,711, filed on Apr. 30, 2004, provisional application No. 60/632,692, filed on Dec. 3, 2004.

(51) Int. Cl.
*H01R 13/62* (2006.01)
(52) U.S. Cl. ...................... 439/157; 439/607
(58) Field of Classification Search .......... 385/92; 439/157, 352, 6
See application file for complete search history.

(56) References Cited

U.S. PATENT DOCUMENTS

| | | | |
|---|---|---|---|
| 6,430,053 B1 | 8/2002 | Peterson et al. | |
| 6,439,918 B1 | 8/2002 | Togami et al. | |
| 6,863,448 B2 | 3/2005 | Chiu et al. | |
| 7,125,261 B2 * | 10/2006 | Yoshikawa et al. | 439/76.1 |
| 7,229,317 B2 * | 6/2007 | Togami et al. | 439/607 |
| 7,264,406 B1 * | 9/2007 | Yoshikawa | 385/88 |
| 2006/0093287 A1 * | 5/2006 | Yoshikawa et al. | 385/92 |
| 2006/0128221 A1 * | 6/2006 | Yoshikawa et al. | 439/607 |
| 2006/0245759 A1 * | 11/2006 | Kurashima | 398/138 |
| 2007/0189673 A1 * | 8/2007 | Yoshikawa | 385/53 |

OTHER PUBLICATIONS

Copending U.S. Appl. No. 11/115,388, filed Apr. 27, 2005, "Pluggable Optical Transceiver With Intelligent Latching/ Releasing Mechanism".
Copending U.S. Appl. No. 11/115,392, filed Apr. 27, 2005, "Pluggable Optical Transceiver With Highly Shielded Structure".
Copending U.S. Appl. No. 11/116,435, filed Apr. 28, 2005, "Intelligent Pluggable Optical Transceiver".

* cited by examiner

*Primary Examiner*—James Harvey
(74) *Attorney, Agent, or Firm*—Smith, Gambrell & Russell, LLP

(57) ABSTRACT

An optical transceiver according to the present invention is a pluggable transceiver to be inserted into a cage of the host system. To release the latching mechanism with the cage, the present transceiver has a bail, a resin-made receptacle member, and a resin-made actuator. The receptacle member attaches the bail in a pivotable arrangement. The bail has a cam to convert its rotation into a seesaw motion of the actuator. The actuator provides a hook in one end thereof, and the seesaw motion of the actuator pulls this hook within the transceiver. Thus, the latching between the transceiver and the cage may be released.

18 Claims, 14 Drawing Sheets

RELEASING MECHANISM OF PLUGGABLE TRANSCEIVER

RELATAED APPLICATION

The present application claims the benefit of prior provisional applications of 60/566,711, filed in Apr. 30, 2004, and 60/632,692, filed in Dec. 3, 2004.

BACKGROUND OF THE INVENTION

1. Field of the Invention

The present invention relates to an optical transceiver, in particular, relates to a releasing mechanism from a cage of a pluggable type optical transceiver.

2. Related Prior Arts

The pluggable transceiver is used in a configuration to be inserted into the cage provided on the substrate of the host system. The cage is a metal box, one end of which is opened for the face panel of the host system, and the pluggable transceiver is inserted into this opening. On the substrate of the host system and in the deep end within the cage is installed with an electronic connector that is to be mated with an electronic plug provided in the transceiver when the transceiver is inserted into the cage, which secures a communication pass between the transceiver and the host system.

It is preferable that, once the transceiver being inserted into the cage, the transceiver is hard to be extracted therefrom. Accordingly, both the transceiver and the cage provide a mechanism to prevent the transceiver from being extracted from the cage when the transceiver receives an optical connector and an optical fiber secured in the optical connector and a semiconductor optical device are optically coupled with each other. In conventional pluggable transceivers, a projection formed in the bottom of the transceiver is latched with an opening formed in the tab provided in the front bottom of the cage to prevent the transceiver from being slipped out from the cage. In order to extract the transceiver from the cage, it is necessary to pull the projection inward the transceiver to release the latching with the opening. In another way, it may release the latching between the projection and the opening to push the tab of the cage outward the transceiver.

Various releasing mechanism of the pluggable transceiver have been reported. The U.S. Pat. No. 6,439,918 has disclosed one mechanism using a bail and an actuator. By rotating the bail in front of the transceiver, which is inserted into the cage, one tip of the bail pushes one end of the actuator outward the transceiver, so the other end of the actuator, which moves in a seesaw motion around an axis, is pulled inward the transceiver. Accordingly, the projection formed in the other end of the actuator is released from the latching with the tab of the cage.

Recently, an idea for utilizing the pluggable transceiver is suggested, in which a host system with a plurality of pluggable transceivers, each densely arranged thereon, is applied for the optical hub system, as shown in FIG. 14. For example, by arranging pluggable transceiver, each having an opening space about one square centimeter, by 16 in horizontal and 2 to 4 in vertical, thus, a hub system can be realized with 32 to 64 channels for the optical communication. In such system and under the condition that neighbor ports receive transceivers and each transceiver mates with an optical connector, the target transceiver can not be occasionally handled to extract it from the cage by the existence of the neighbor transceivers and the optical cables.

The present invention was performed based on the above subject. That is, the present invention is to provide a releasing mechanism that, even in the optical hub with densely arranged transceivers, the target transceiver can be easily extracted from the cage.

SUMMARY OF THE INVENTION

An optical transceiver according to the present invention has a pluggable configuration that is capable of being inserted into the cage of the host system. The transceiver provides a releasing mechanism for the engagement with the cage including a receptacle member, a bail, and an actuator.

The receptacle member has a pair of sides and a center partition between the sides. The bail, attached to the receptacle member, has a pair of leg portions and a bridge portion connecting the leg portions. The leg portion provides an opening into which the axial projection formed in the side of the receptacle portion passes. The bail is installed so as to rotate, in front of the front face of the receptacle portion, with the axial projection as a center of the rotation. The actuator includes an arm portion, a support portion, and a body portion. The arm portion and the body portion may operate in seesaw motion with the support portion as the pivot of the motion. Moreover, the arm portion provides a hook in an end portion thereof to engage with the cage. The transceiver of the present invention has a characteristic in that the bail has a cam mechanism to convert the rotation of the bail into the seesaw motion of the actuator.

The bail provides a sliding projection in an end portion thereof. On the other hand, the actuator provides an inner sliding surface in contact with the cam and an outer sliding surface in contact with the sliding projection. Accordingly, since the actuator operates the seesaw motion as being sandwiched by the cam and the sliding projection of the bail, not only the rotational motion may be carried out in smooth but also the actuator can be prevented from disassembling from the bail and the receptacle member.

The leg portion is preferable to offset the primary surface including the opening with the secondary surface including the sliding projection. By applying such configuration, even the bail receives a strong stress, the mating between the axial projection of the sides of the receptacle member and the opening of the leg portion of the bail may be prevented from releasing.

The cam may be characterized in that it has a composite shape including first to third portions. The second portion is substantially linear. The distance from the third portion to the rotational center of the bail is set to be larger than the distance from the first portion to the rotational center. In an initial position of the bail, namely, the hook provided in the end of the actuator engages with the cage, the first portion of the cam is in contact to the inner sliding surface of the actuator, and at the same time, this inner sliding surface makes an predefined angle to the line of the second portion of the cam. Therefore, even when the bail is rotated from its initial portion, the rotation of the bail is not converted into the seesaw motion of the actuator during the rotation is within the predefined angle. The bail may have play in its rotation by the predefined angle. Further rotating the bail, the rotation of the bail does not convert into the seesaw motion of the actuator until the second portion of the cam is in contact with the inner sliding surface.

The axial projection provided in the sides of the receptacle member may have a shape including two circles concentric to each other with a portion of the outer circle being cut to expose the inner circle. The opening provided in the leg portion may have a stopper projection in an edge thereof, which is received by the cut portion of the axial projection of the receptacle member. According to the configuration above, the rotation of the bail may be controlled by abutting the stopper projection within the opening against a side of the cut portion of the axial projection. Moreover, by forming a rib on the side of the receptacle member and by abutting one edge of the leg portion of the bail, the rotation of the bail may be controlled.

The releasing mechanism of the present invention enables, by pressing down the front end of the actuator, to convert the seesaw motion of the actuator into the rotation of the bail. Even when a plural transceivers is engaged in high density with the cage and enough space to handle and to rotate the bail can not be obtained, according to the present configuration, the transceiver may be released from the cage only by pressing down the front end of the actuator.

Moreover, it is preferable that the transceiver has a tab in a front bottom of the cover thereof and the tab supports the actuator from the bottom.

Figure 5A:
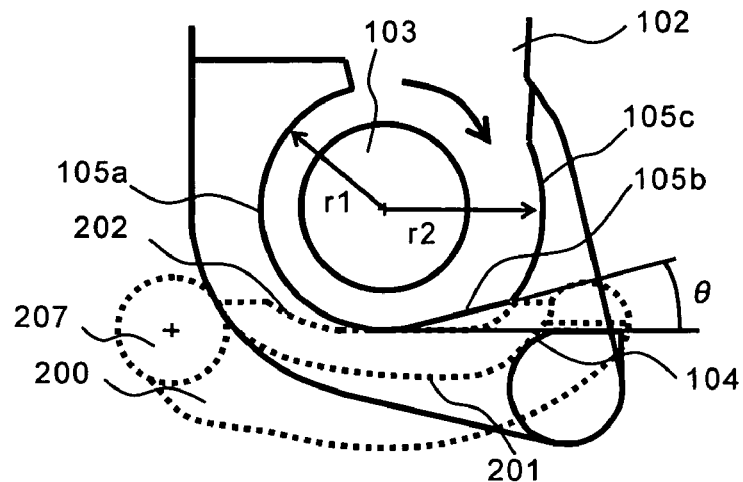
Figure 5B:
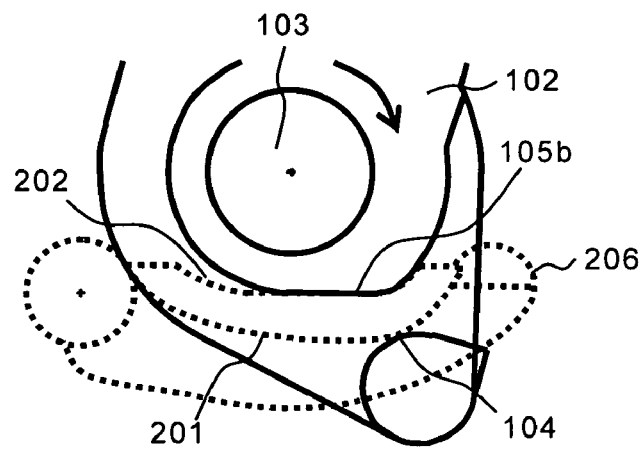
Figure 5C:
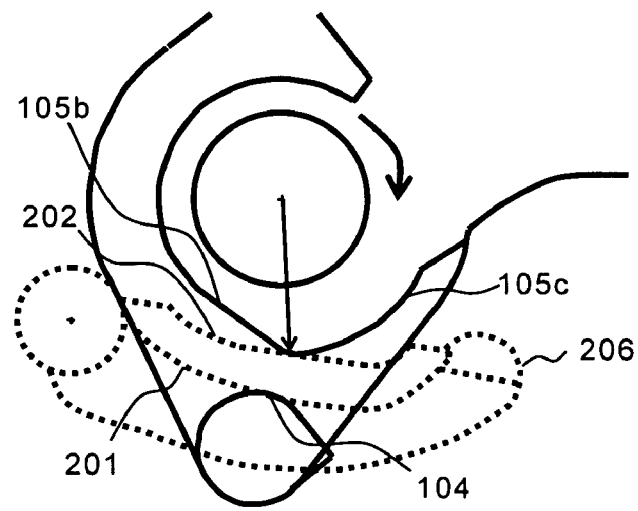
Figure 6:
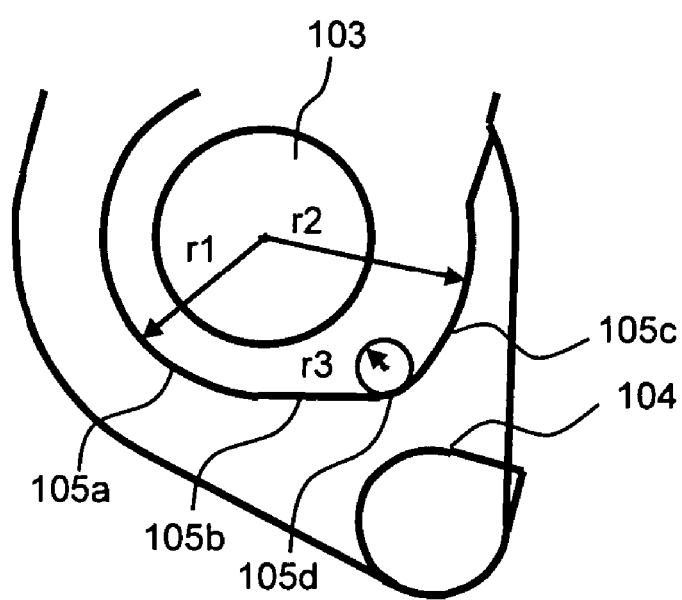
Figure 7A:
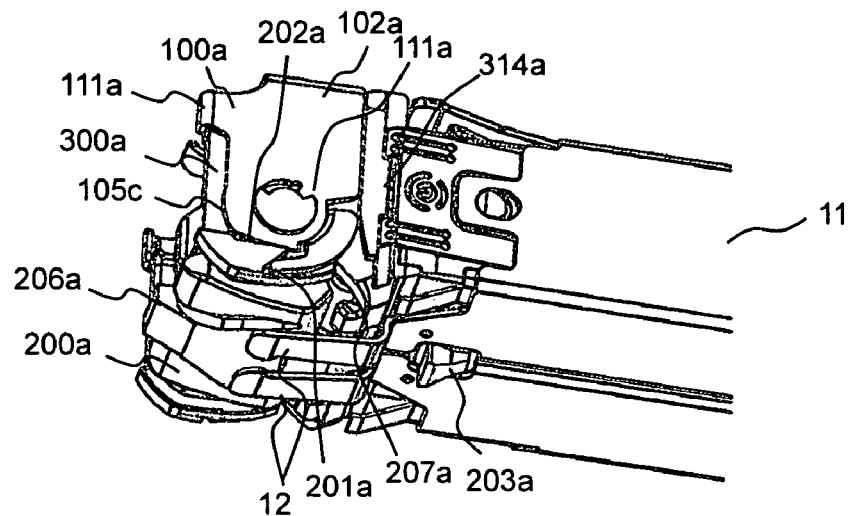
Figure 7B:
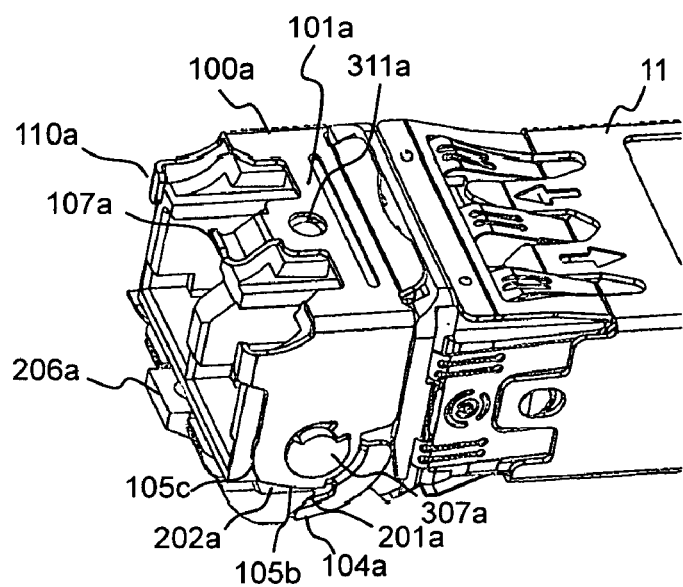
Figure 8A:
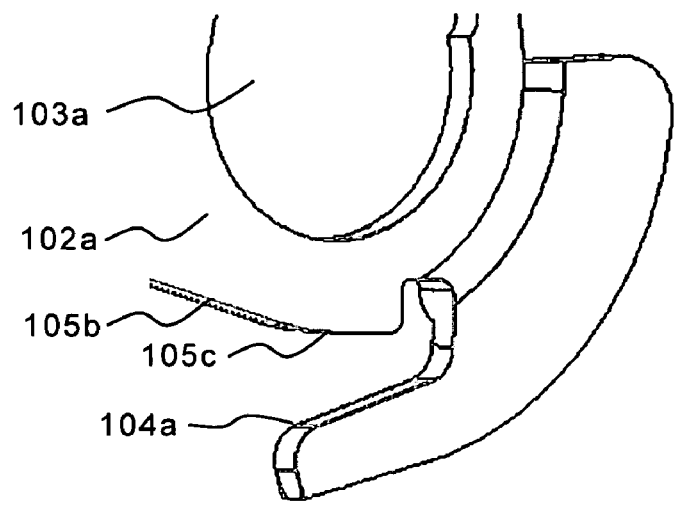
Figure 8B:
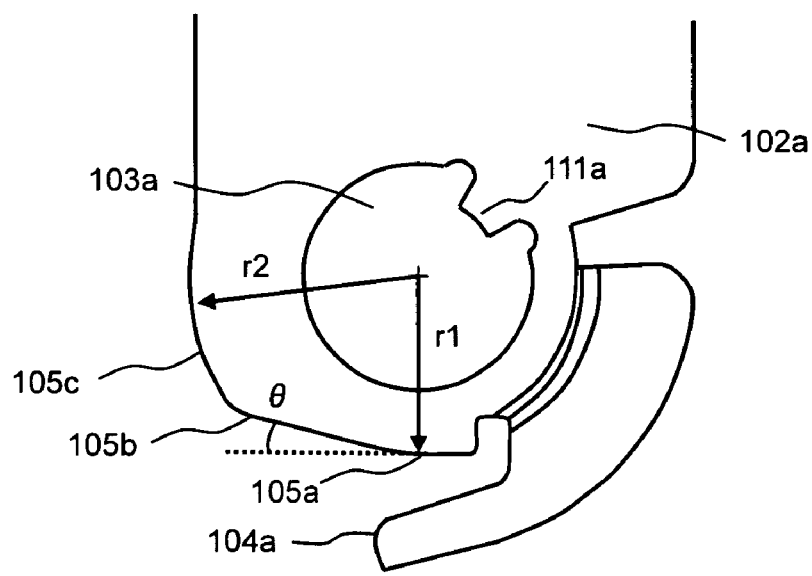
Figure 9A:
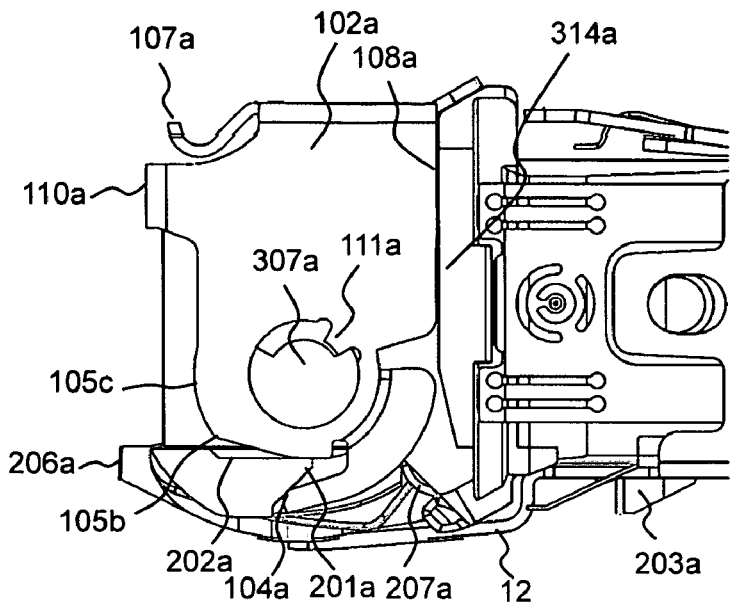
Figure 9B:
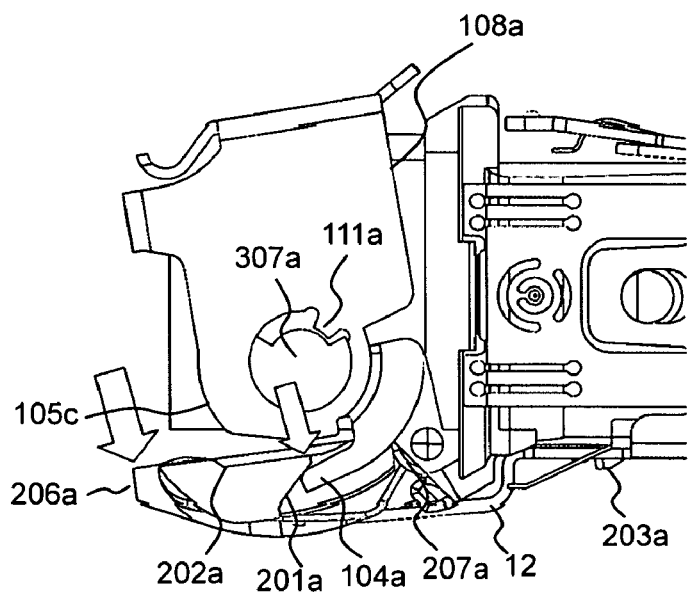
Figure 10:
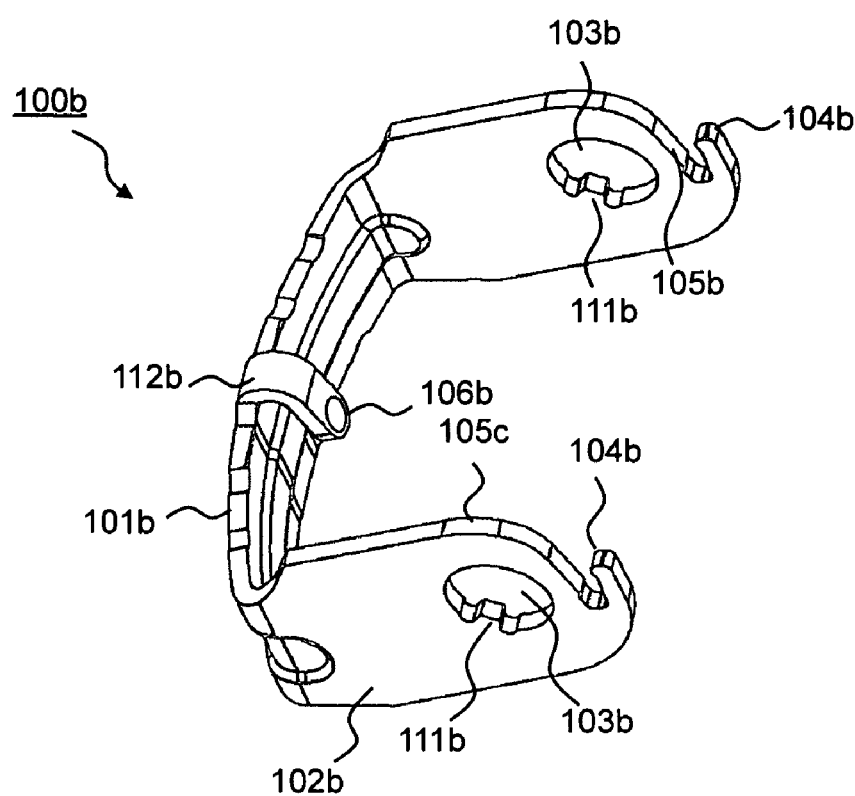
Figure 11A:
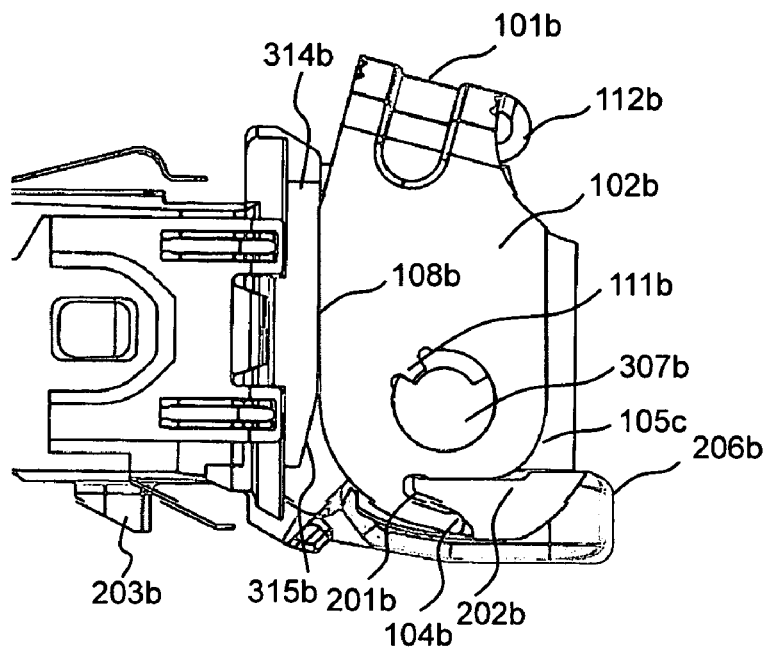
Figure 11B:
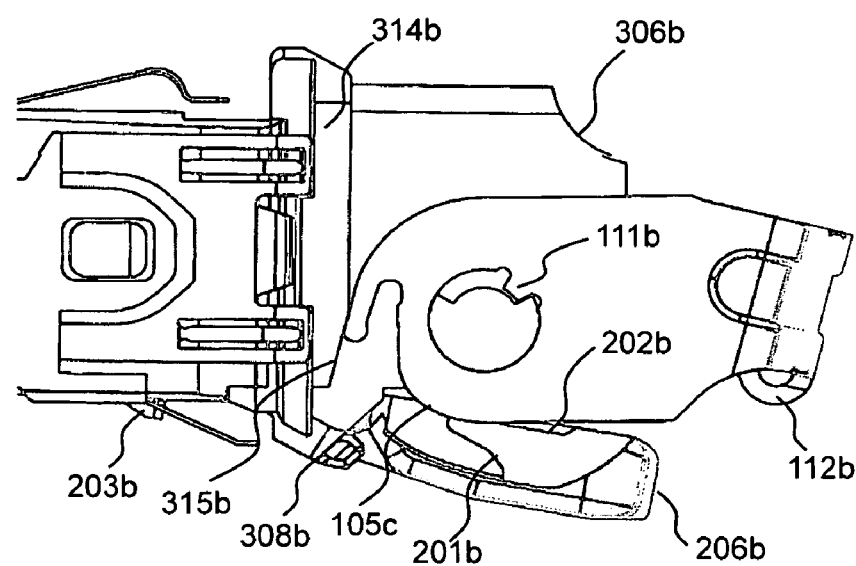
Figure 12:
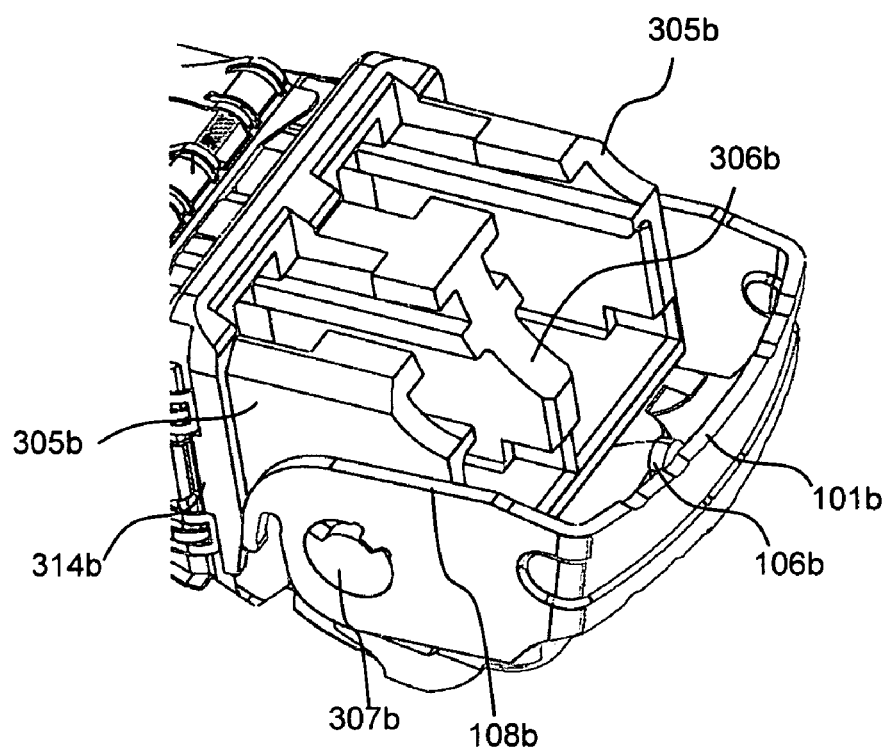
Figure 13:
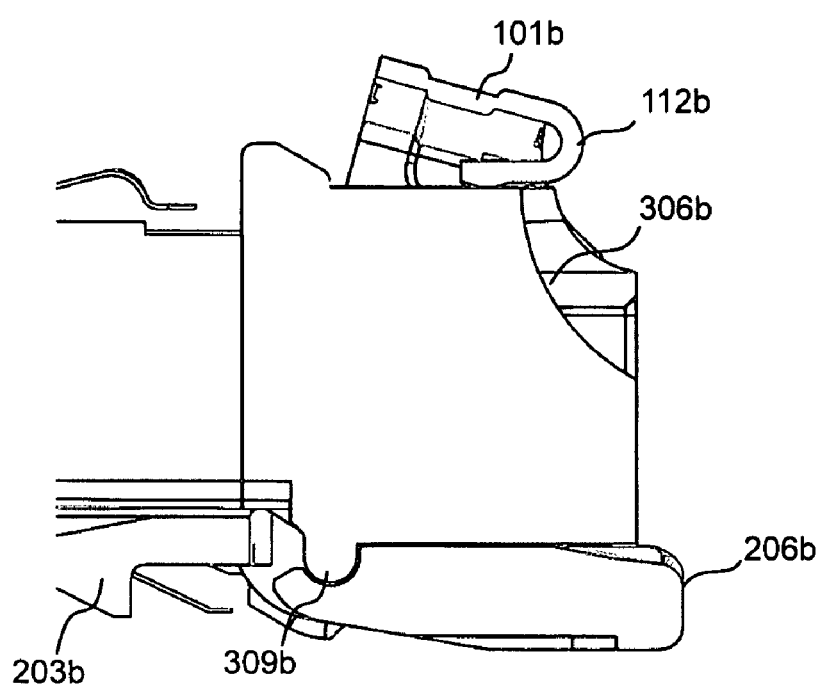
Figure 14:
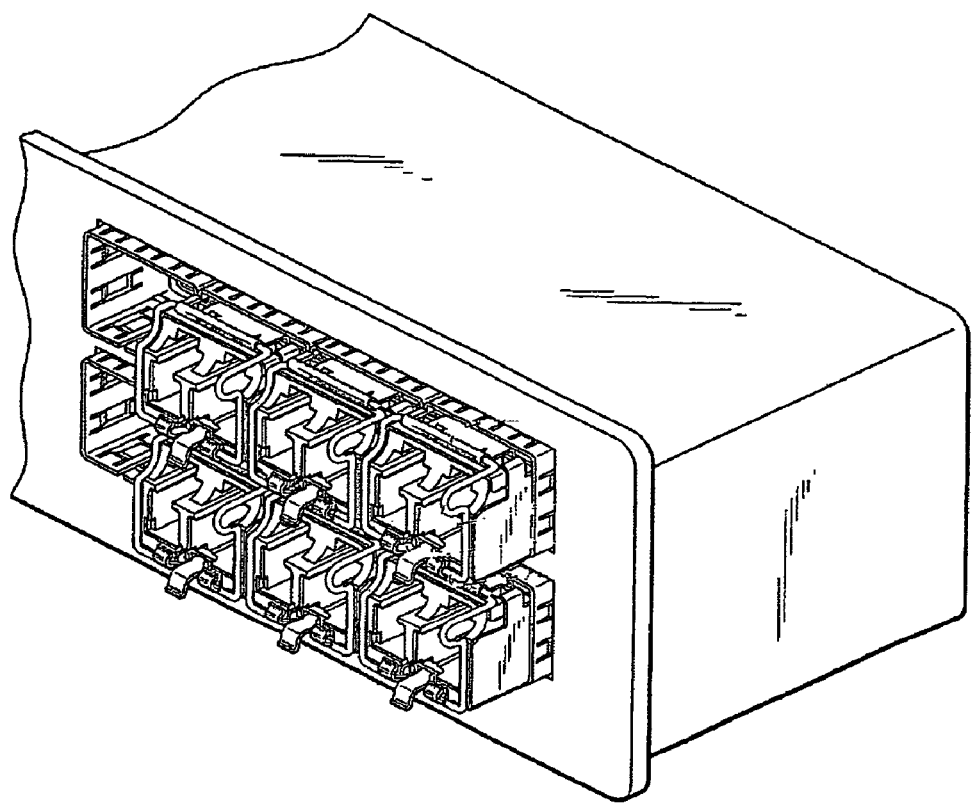

from FIG. 5A to FIG. 5C show in series the motion of the bail and the actuator of the first embodiment of the invention;

FIG. 6 shows one modification of the cam provided in the bail of the first embodiment;

FIG. 7A is a perspective drawing of a portion of the receptacle according to the second embodiment of the invention, and FIG. 7B is a perspective drawing viewed from another direction;

FIG. 8A expands a portion of the cam provided in the bail of the second embodiment, and FIG. 8B explains a function of the cam and the bail;

FIG. 9A shows a motion of the latching mechanism of the second embodiment, and FIG. 9B shows a de-latching mechanism based on the motion of the tip of the actuator;

FIG. 10 is a perspective drawing of one modification of the second embodiment;

FIG. 11A is a side view showing the rotation of the modified bail illustrated in FIG. 10 and the motion of the actuator, and FIG. 11B is a side view showing a de-latched state using the modified bail;

FIG. 12 is a perspective drawing of the modified bail, which is illustrated in FIG. 10, attached to the receptacle;

FIG. 13 is a section showing an attachment of the modified bail illustrated in FIG. 10; and FIG. 14 shows a state when a plurality of conventional transceiver is installed in the face panel in high density.

DESCRIPTION OF PREFERRED EMBODIMENTS

Next, the releasing mechanism from the cage according to the present invention will be described as referring to accompanying drawings. In drawings and the specification, the same numerals and symbols without overlapping description will refer the same elements.

Figure 1:
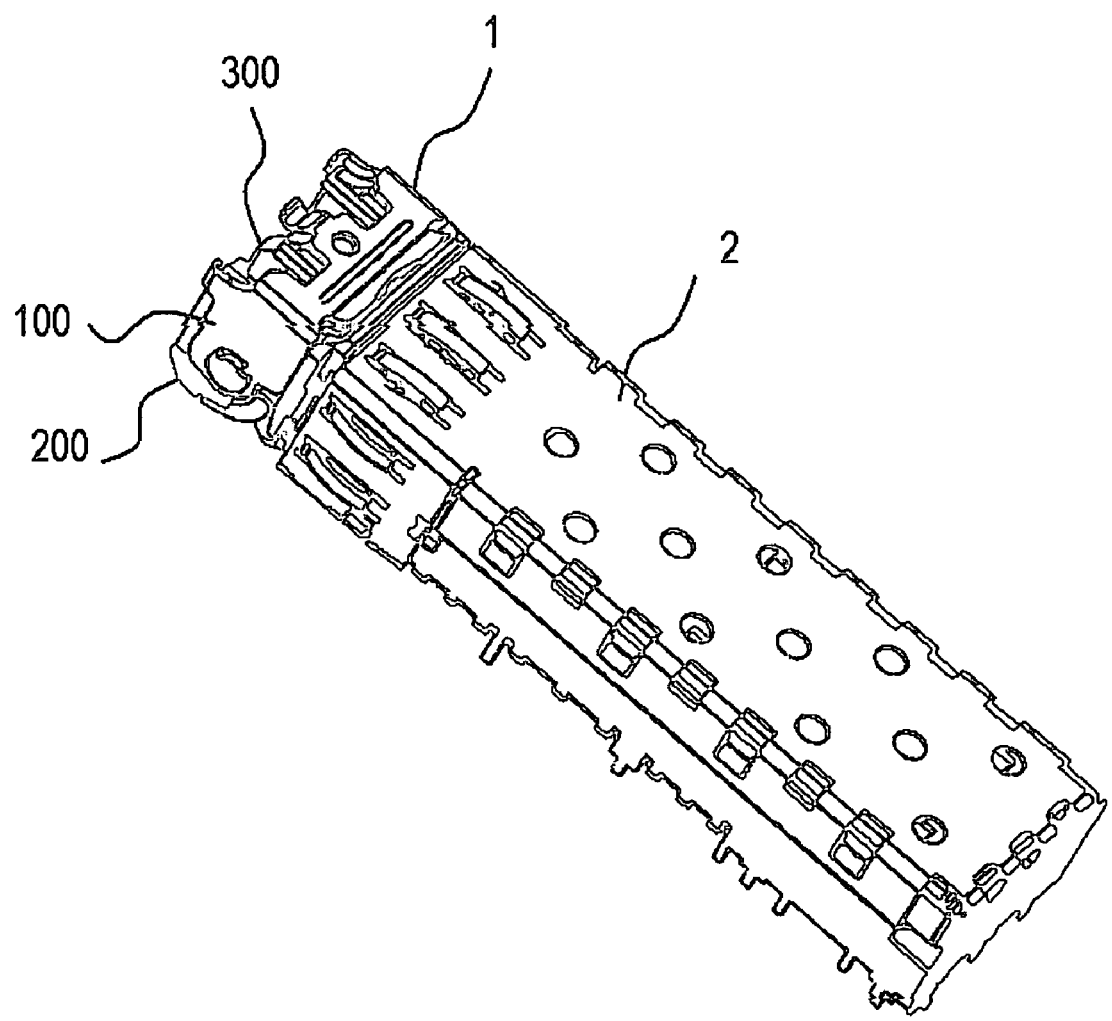
FIG. 1 is a perspective view showing the optical transceiver of the present invention inserted into the cage.

FIG. 1 is a perspective view of an optical transceiver 1 of the present invention inserted into a cage 2. FIG. 1 omits the substrate mounting the cage 2 and face panel of the host system.

Figure 2A:
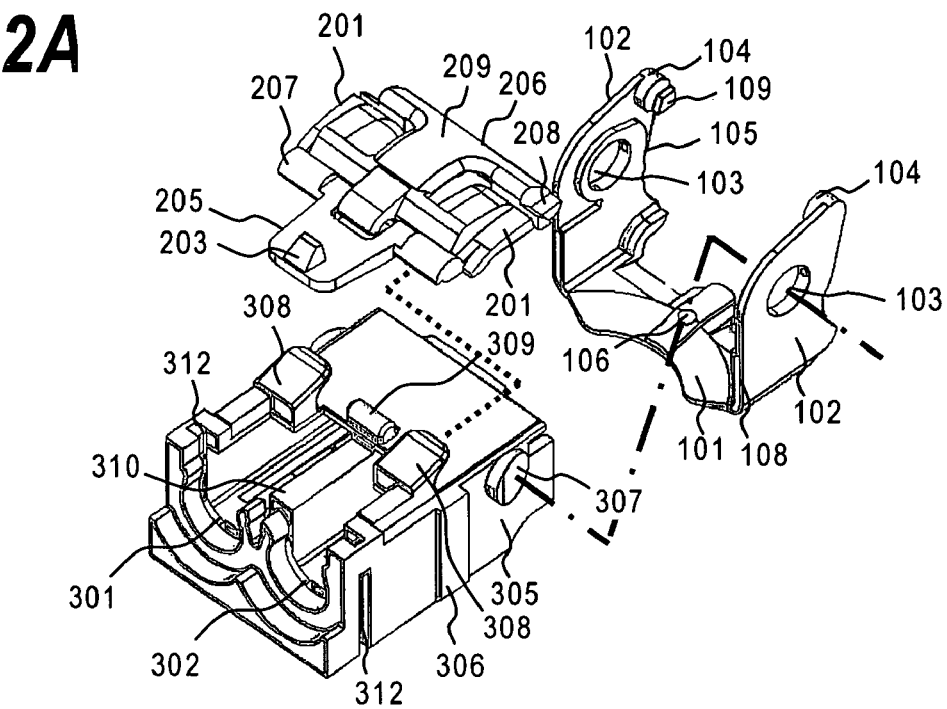
FIG. 2A is an assembly drawing of the latching mechanism including the bail, the actuator, and the receptacle.
Figure 2B:
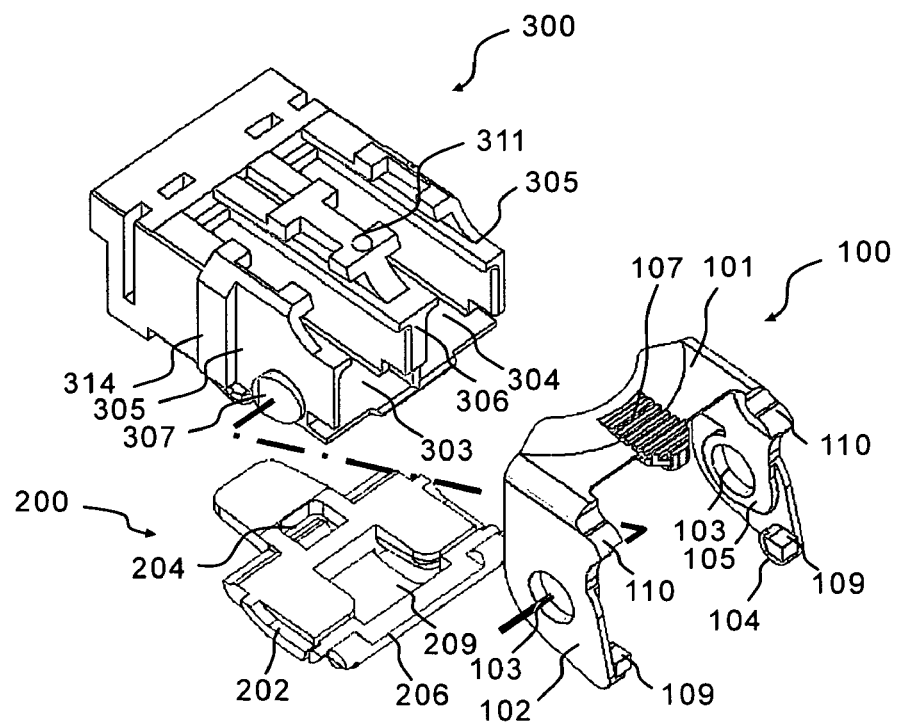
FIG. 2B is an assembly drawing viewed from another direction.

The cage 2 is made of metal box with a plurality of circular holes. On the forward end thereof is provided with a plurality of ground fingers 3, which reinforces the ground potential by making in contact with an edge of the opening formed in the face panel, when this cage 2 is installed on the host system such that the end of the cage 2 protrudes from the opening. The transceiver 1 is to be inserted into the opening of the cage 2 such that only the forward end of the transceiver 1, i.e., a bail 100, an actuator 200, and a receptacle member 300, these are subjects of the present invention, protrude from the cage 2. This protruding portion of the transceiver 1 is also protruding from the face panel of the host system FIG. 2A is an assembly drawing of the latching mechanism including the bail 100, the actuator 200, and the receptacle member 300, and FIG. 2B is an assembly drawing viewed from another direction. Molding resin forms the bail 100, the actuator 200, and the receptacle member 300. The bail 100 and the actuator 200 are attached to the actuator 300.

The bail 100 comprises a pair of leg portions 102 and a bridge portion 101 connecting these leg portions 102. The leg portion 102 provides an opening 103 in a center portion thereof to assemble this bail 100 with the receptacle member 300. The bail 100 is capable of rotating with the opening 103 as a center of the rotation. The leg portion 102 forms a cam 105 around the opening 103 of the inner side thereof to convert the rotation of the bail 100 into seesaw motion of the actuator 200. Details of the rotation of the bail 100, the seesaw motion of the actuator, and the operation of the cam 105 to connect the former motion to the latter motion will be described later.

The bail 100, in the tip thereof, has a sliding projection 104 and a rectangular projection 109 on the sliding projection 104. The rectangular projection 109 aligns the tip of the leg portion 102 with the front end 206 of the actuator 200. The sliding projection 104 slides on the outer sliding surface 201 of the actuator 200 as the bail 100 rotates, to support the actuator 200 from the downside not to disassemble the actuator 200 with the receptacle member 300.

One side 108 of the leg portion 102 is in contact with the side of the rib 314 formed in the receptacle member 300, that is, the rib 314 operates as a stopper for the rotation of the bail 100. The bail 100 forms a flat portion 110 on the other side in the bridge portion 101. This flat portion 110 operates as a grip for rotating the bail 100. Moreover, the bridge portion 101 forms a plurality of ribs and grooves 107 in a center thereof, which operates as a grip.

The bridge portion 101 provides a dimple 106 on an inner side thereof, which receives the projection 311 formed on the upper surface of the receptacle member 300 to keep the bail 100 in a neutral position. The dimple 106 and the projection 311 may be opposite, that is, the bail 100 provides a projection 106 in the bridge portion 101, while the receptacle forms a dimple 311 at a position corresponding to the projection 106.

The receptacle member 300 assembles the actuator 200 that moves in seesaw as the bail 100 rotates. The actuator 200 has a support portion 207, an arm portion 205 in one side to the support portion 207, and a body portion 209 in the other side for the support portion 207. The arm portion 205 has a hook 203 in the end thereof, which engages with the latching tab of the cage 2 shown in FIG. 1. On the other hand, the front end 206 of the body portion 209 aligns, when the bail 100 is in the neutral position, with the end of the rectangular projection 109 of the bail 100.

The actuator 200 is assembled with the receptacle member 300 such that the hooked portion 308 of the receptacle member 300 receives the support portion 207 and a depression 204 formed in a surface opposite to that providing the hook 203 receives a projection 309 formed in the bottom surface of the receptacle member 300. The arm portion 205 and the body portion 209 of the actuator 200 moves in the seesaw motion around the support portion 207 as the center of the rotation.

The sliding projection 104 formed in the tip of the leg portion 102 slides on the outer sliding surface 201 formed in both sides of the body portion 209 of the actuator 200 as the rotation of the bail 100. On the other hand, a surface of the cam 105 formed inside of the leg portion 102 of the bail 100 slides on an inner sliding surface 202 of the actuator 200 as the rotation of the bail 100. Thus, the actuator 200 can move in the seesaw motion.

The receptacle member 300 is formed by molding resin, and has a pair of cavities, 301 and 302, that receives a transmitting optical assembly and a receiving optical assembly, each having a package and a sleeve. The cavities, 301 and 302, of the receptacle member 300 are divided by the center partition 310. In the other side thereof, i.e., a side protruding from the face panel of the host system, the receptacle member 300 has a pair of optical receptacles, 303 and 304, formed by a pair of sides 305 and a center partition 306. One of optical receptacles 303 is connected to the cavity 301, while the other optical receptacle 304 is connected to the other cavity 302. By inserting the flange, which is provided in the transmitting optical assembly and in the receiving optical assembly into grooves 312, the position of the assemblies within the cavities, 301 and 302, can be automatically determined. The side 305 has the rib 314 on the outer surface thereof, which operates as the rotation stopper of the bail 100. By abutting the rear side 108 of the leg portion 102 of the bail 100 against the side of this rib 314, the motion of the bail 100 can be controlled. Moreover, the side 305 further provides an axial projection 307 on the outer surface thereof. The bail 100 can rotate by passing this axial projection 307 into the opening 103 provided in the center of the leg portion 102 of the bail 100.

The receptacle member has a plurality of structures in the bottom thereof to control the seesaw motion of the actuator 200. A projection 309, whose section is substantially semi-circular, is formed in a center portion of the bottom surface, which is received in a depression 204 formed in a root of the arm portion 205 of the actuator 200. Both sides of the bottom of the receptacle member 300 form hooked portions 308 that receives the support portion 207 of the actuator 200. The support portion 207 is formed in a surface opposite to that providing the depression 204 and a root of the arm portion 205, which has a substantially semicircular section. Therefore, the actuator 200, in particular, the arm portion 205 and the body portion 209, can move in the seesaw motion to each other in the axis 207 as the center of the motion. The projection 309 in the center of the bottom of the receptacle member 300 prevents the actuator 200 from disassembling from the receptacle member 300.

The receptacle member 300 also has a projection 311 on the top surface of the center partition 306, which engages with the dimple 106 provided in the inner surface of the bride portion 101. When the bail 100 is in the initial position, this dimple 106 and the projection 311 engage with each other to stabilize the position of the bail 100. As described, the relation between the projection 311 and the dimple 106 may be opposite to each other.

Figure 3A:
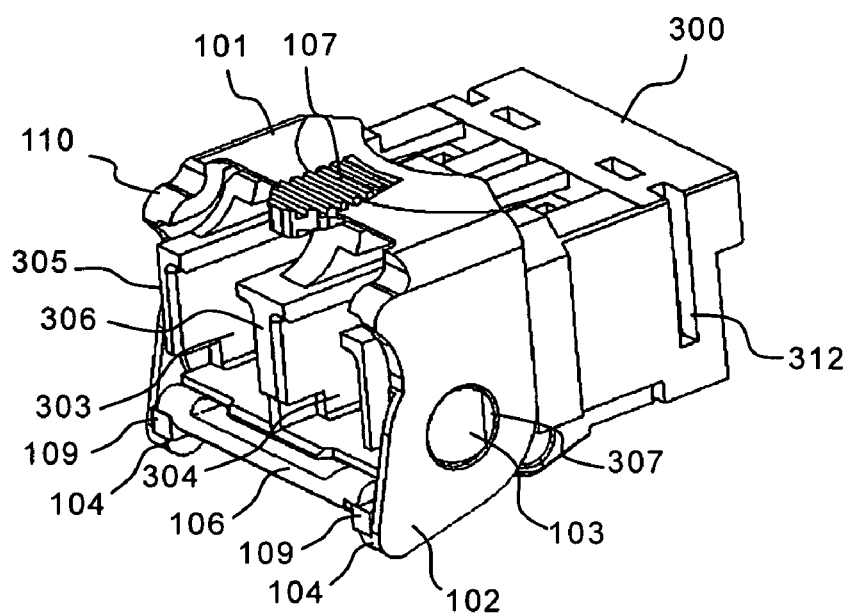
FIG. 3A is a perspective drawing of the latching mechanism.
Figure 3B:
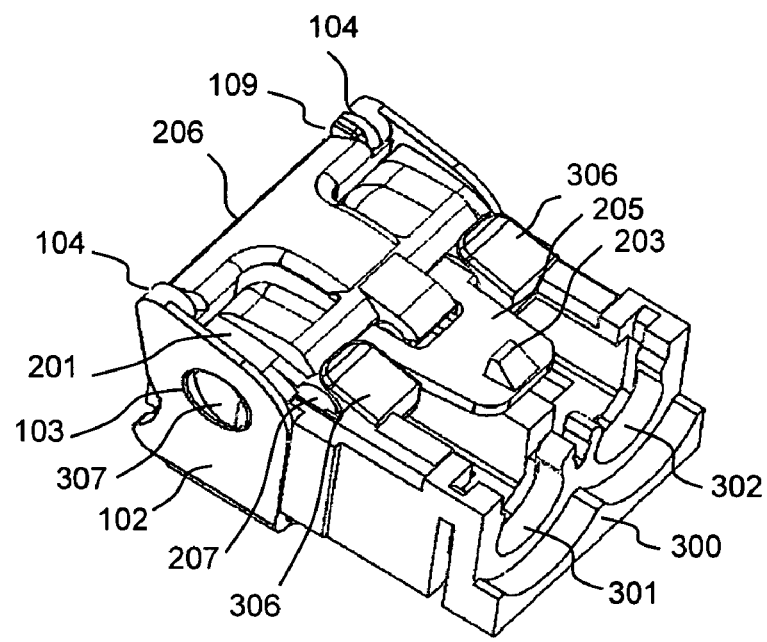
FIG. 3B is a perspective drawing viewed from another direction.

FIG. 3A is a perspective drawing of the bail 100, the actuator 200, and receptacle member 300 assembled with each other and the bail 100 is in its initial position. FIG. 3B is a perspective drawing illustrating the same assembly viewed from the bottom thereof.

When the bail 100 positions in its initial state, the bridge portion 101 thereof is positioned in upward of the receptacle member 300 so as to open two optical receptacles, 303 and 304. This position also corresponds to that when the optical connector mates with two optical receptacles, 303 and 304. That is, the front end 206 of the actuator 200 is in the highest position thereof with the front of the receptacle 300, and the rectangular projection 109 aligns the front end 206 of the actuator 200.

FIG. 3B is a perspective drawing of the assembled members viewed from the bottom side, where the bail 100 is in the initial position. The arm portion 205 of the actuator 200 and the hook 203 provided in the end thereof separate from the receptacle member 300. The sliding projection 104 formed in the end of the leg portion 102 is in the very front of the outer sliding surface 201 of the actuator 200, while the rectangular projection 109 aligns the front end 206 of the actuator 200.

Figure 4A:
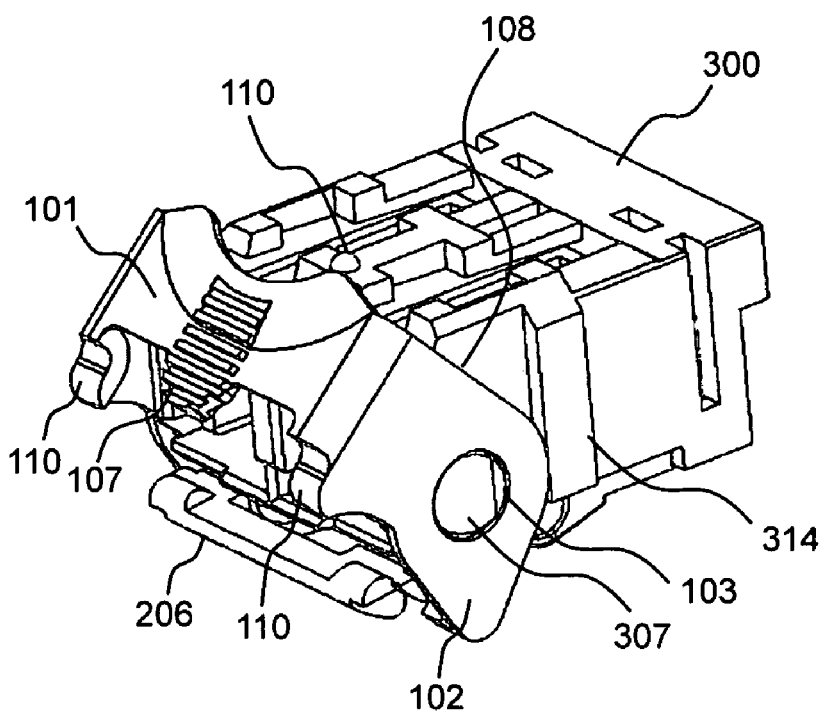
FIG. 4A is a perspective drawing of the latching mechanism when the bail is rotated.
Figure 4B:
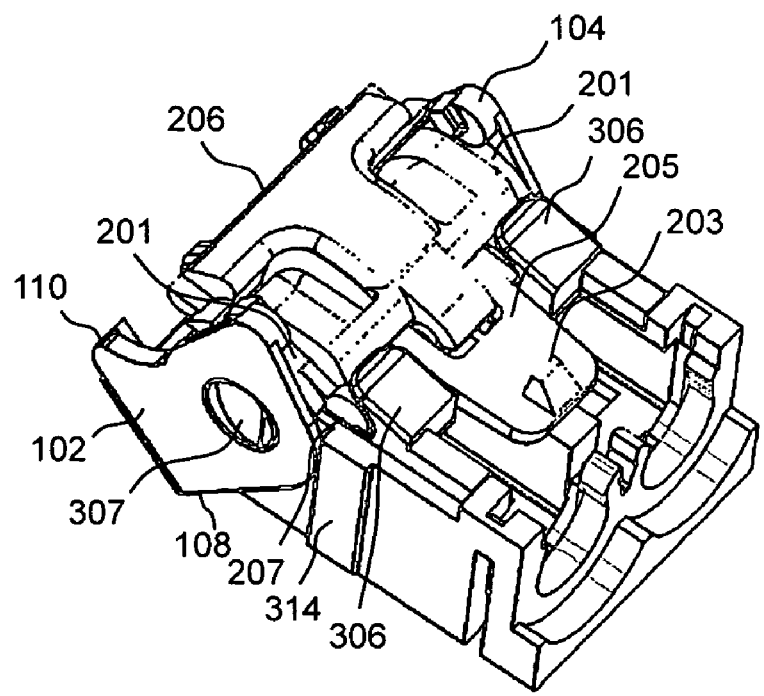
FIG. 4B is a perspective drawing viewed from another direction.

FIG. 4A and FIG. 4B are states when the bail 100 rotates from the state shown in FIG. 3A and FIG. 3B. The rotation of the bail 100 can be easily carried out by holding the grip 107 on the center partition 306 or the flat portion provided in the both sides of the bridge portion 101.

Since the rear edge of the leg portion 102 curves, the rib 314 does not disturb the rotation of the bail 100. The front end 206 of the actuator is pushed downward as the rotation of the bail 100. As described later, the actuator 200 does not disassemble completely from the receptacle member 300 because the sliding projection 104 and the cam 105 both formed in the leg portion 102 puts the actuator 200 therebetween.

FIG. 4B illustrates that arrangement. That is, the sliding projection 104 in the tip thereof slides on the outer sliding surface 201 of the actuator 200 as the rotation of the bail 100. This sliding projection 104 supports the actuator 200 from the bottom side to prevent the disassembling of the actuator from the receptacle member 300. Due to the function of the cam 105 formed in the inner surface of the bail 100, in particular, the radius of the cam surface increases as the rotation of the bail 100, the inner sliding surface 202 that is in contact to this cam surface is pressed downward. Working with this downward motion of the inner sliding surface 202, the arm portion 205 is pushed upward, which pulls the hook 203 provided in the tip of the arm portion 205 to the receptacle member by the seesaw motion around the axis 207 as the pivot.

From FIG. 5A to FIG. 5C are schematic drawings explaining the relation between the rotation of the bail 100 and the seesaw motion of the actuator 200. In drawing, solid lines denote the actuator 200, while dotted lines correspond to the actuator 200.

First, as shown in FIG. 5A, the bail 100 is in the initial and neutral position. Although not illustrate in FIG. 5A, the dimple 106, then, formed in the center of the bridge portion 101 engages with the projection 311 formed in the center partition of the receptacle member. In this neutral position, the first surface 105a of the cam 105 is in contact with the inner sliding surface 202 of the actuator 200.

The cam 105 has a first arc portion 105a with a radius of r1, measured from the rotation center of the bail 100, a linear portion 105b smoothly continuing from the first arc portion 105a, and a second arc portion 105c with a radius of r2 continuing to the linear portion 105b. In this neutral position, the linear portion 105b makes an angle θ to the inner sliding surface 202. The outer sliding surface 201 is in contact with the sliding projection 104 in the very front thereof.

FIG. 5B illustrates a state that the bail 100 rotates in clockwise from the neutral position. When the rotation is within the angle θ, only the boundary point between the first arc portion 105a and the linear portion 105b slides on the inner sliding surface 202 and the distance from the inner sliding surface 202 to the rotation center is kept constant to be radius r1, the actuator 200 is not pressed downward. The sliding projection 104 also slides on the outer sliding surface 201. However, the outer sliding surface 201 has an arc shape with a constant radius to the rotation center in this region of the rotation angle smaller than θ, so the sliding projection 104 does not press down or does not lift up the actuator 200. That is, within the rotation angel smaller than θ is a play range where the rotation of the bail 100 is not converted to the seesaw motion of the actuator 200.

Further rotating in clockwise the bail 100 from the angle θ, the second arc portion 105c comes in contact with the inner sliding surface 202 of the actuator 200. As illustrated in FIG. 5C, due to the relative position of the rotation center of the bail 100, the support portion 207 of the actuator 200, and the inner sliding surface 202 thereof, an action can be realized that, as the bail 100 further rotates from the angle θ, the boundary point between the linear portion 105b and the second arc portion 105c presses down the inner sliding surface 202 of the actuator. Moreover, working together the rotation of the bail 100, the sliding projection 104 of the bail 100 continues to slide on the outer sliding surface 201. That is, the actuator 200 is pressed down, i.e., a direction apart from the receptacle member 300, as it is sandwiched between the cam 105 and the sliding projection 104 of the bail 100.

To rotate the bail 100 further makes the boundary between the linear portion 105b and the second arc portion 105c contact in an rear arc portion of the inner sliding surface 202. This rear arc portion has a constant radius to the rotation center of the bail 100. Therefore, the rotation of the bail 100 may not be converted into the up-and-down motion of the actuator 200 even when the bail 100 is further rotated. That is, under this condition, the second arc portion 105c of the bail 100 and the rear sliding surface 202 of the actuator come in contact throughout.

Thus, when the bail 100 rotates from its neutral position, the initial position shown in FIG. 5A, the rotation can be not converted into the up-and-down motion of the actuator 200 until the rotation becomes the angle θ and exceeding the angle θ, starts the vertical motion of the actuator 200. Moreover, when the rotation angle reaches a predefined angle greater than θ, which is greater than θ, the rotation is not converted into the vertical motion of the actuator 200 again, even the bail 100 further rotates. Further, when the bail 100 is rotated in counterclockwise from the state illustrated in FIG. 5C, the mechanism of the rotation of the bail 100 and the up-and-down motion of the actuator 200 does not change.

FIG. 6 shows one modification of the cam 105. In the embodiment illustrated in FIG. 5A to FIG. 5C, the linear potion 105b and the second arc portion 105c of the cam are roughly connected to each other. The example shown in FIG. 6 provides the third arc portion 105d in this roughly connected portion. By setting the radius r3 of this third arc portion enough smaller than those of first and second arc portions, r1 and r2, respectively, the rotation of the bail 100 and the up-and-down motion of the actuator 200 are not affected. Furthermore, since the boundary between the linear portion 105b and the second arc portion 105c becomes dull, the contact between this boundary point and the inner sliding surface 202 of the actuator 200 becomes smooth.

The descriptions aforementioned are based on the configuration that the bail 100, the actuator 200 and the receptacle member 300 are all made of resin. The second and third embodiments described hereinafter are the case that the bail 100 is made of metal.

FIG. 7A and FIG. 7B explain the releasing mechanism using a bail 100a according to the second embodiment of the present invention. The releasing mechanism of this embodiment comprises a metal bail 100a, a resin-made actuator 200a, and a resin-made receptacle member 300a. The bail 100a of this embodiment has different configuration described below to those of the previously explained bail 100 of the first embodiment.

In the bail 100 of the first embodiment, the cam 105, which converts the rotation of the bail 100 into the up-and-down motion of the actuator 200, is provided in the inner side of the leg portion 102 of the bail 100 to surround the rotational center thereof. While in the present embodiment 100a, the outer shape of the leg portion 102a operates as a cam 105. That is, the leg portion 102a provides an opening 103a in a center portion thereof and a first arc portion 105a with a radius r1 by the opening 103a as a center, a linear portion 105b, and a second arc portion 105c with a radius r2. Further, the opening 103a provides a stopper projection 111a in the inner edge thereof to stop the rotation of the bail 100a. On the other hand, the axial projection 307a formed in the outer side of the receptacle member 300a has a shape that two concentric circles, a portion of the outer circle being cut, are combined. The bail 100a rotates on the outer circle, while the stopper projection 111a slides on the inner circle within the cut portion, which secures the smooth rotation of the bail 100a within an effective range.

The bail 100a of the present embodiment provides a head structure 104a in the tip of the leg portion 102a, which is equivalent to the sliding projection 104 of the first embodiment. To put the inner and the outer sliding surfaces, 201a and 202a, of the actuator 200 between this beaked hook and the cam side, from 105a to 105c, of the leg portion 102a prevents the actuator 200a from disassembling. Further, as shown in FIG. 7A, the transceiver 11 has two tabs extending a front bottom portion of the case thereof to support the actuator 200a from the bottom, which is also effective to disassemble the actuator from the bail 100a.

The bridge portion 101a has a grip 107a in a center thereof, which is equivalent to the grip 107 of the first embodiment, and a pair of grips 110a in both sides thereof. Moreover, in the releasing mechanism of the present embodiment, another grip 206a is formed in the frond end of the actuator 200*a* to cause the rotation of the bail 100*a*. In the first embodiment, since the cam 105 and the sliding projection 104 of the bail 100 put the actuator 200 therebetween, it is hard to cause the rotation of the bail 100 even when the front end of the actuator is pressed down. However, in the present embodiment as will be shown in FIG. 9B, to press down the front end 206*a* of the actuator 200 may cause the rotation of the bail 100*a*.

When the host system installs a plurality of pluggable transceivers in high-density and one of such transceiver is to be extracted from the cage of the host system, occasionally, the bail of the target transceiver can not be directly handled in the case that transceivers neighbor to the target transceiver mate with optical connector. In such conditions, not only the bail itself but also the actuator in its front end to release the transceiver from the cage is one of preferable functions for the pluggable transceiver.

FIG. 8A and FIG. 8B expand the leg portion 102*a*, the cam 105, and the head structure 104*a* of the present embodiment. As shown in FIG. 8A, the head structure 104*a* is offset from the primary surface of the leg portion 102*a* to strengthen the hold of the actuator 200*a* by the head structure 104*a* and the cam 105 therebetween. That is, in the case that the head structure 104*a* is formed in the same surface with that of the leg portion 102*a*, the leg portion 102*a* is pressed outward when pressing down the front end 206*a* of the actuator 200*a* to cause the rotation of the bail 100*a*. By making the beaked portion 104*a* offset from the primary surface of the leg portion 102*a*, even such outward pressure is affected to the bail 100*a*, it may be prevented that the leg portion 102*a* is slipped out from the axial projection 307*a* of the receptacle member 300.

FIG. 8B is a schematic drawing of the cam 105 of the present embodiment. The cam 105 has the first portion 105*a*, a linear portion 105*b*, and a second arc portion 105*c*, these portions being equivalent to those appeared in the cam of the first embodiment. However, in the present cam 105, when the bail 100*a* is in the neutral position shown in FIG. 8B, the first portion 105*a*, which is substantially linear, is in contact with the inner sliding surface 202*a* of the actuator 200*a*, as shown in FIG. 7A and FIG. 7B.

As rotating the bail 100*a*, in counterclockwise in FIG. 8B, from this position, the rotation of the bail 100*a* is not converted into the up-and-down motion of the actuator 200*a* until the linear portion 105*a* is in contact with the inner sliding surface 202*a* of the actuator 200*a*. That is, from the neutral position to the angle θ brings play in the rotation of the bail 100*a*. The boundary between the linear portion 105*b* and the second arc portion 105*c*, which has a radius r2 to the rotational center of the bail 100*a*, does not press down the inner sliding surface 202*a* of the actuator 200*a* until the rotation exceeds the angle θ. Depending on the relative position of the rotational center of the bail 100*a*, that of the actuator 200*a*, and the contact point to the inner sliding surface 202*a*, the actuator 200*a* is pressed down as the bail 100*a* rotates. Although the second arc portion 105*c* is a limited range, the stopper projection 111*a* formed in the inside of the opening 103*a* controls the rotation of the bail 100*a* before the end of the second arc portion 105*c*. Moreover, during the rotation of the bail 100*a*, the head structure 104*a* of the leg portion 102*a* is in contact with and supports the outer sliding surface 201*a* of the actuator 200*a* throughout. Accordingly, in combined with the tabs 12 protruding from the front bottom of the transceiver, the actuator 200*a* does not disassemble from the receptacle member 300*a*.

FIG. 9A and FIG. 9B are side views explain the rotation of the bail 100*a* and the seesaw motion of the actuator 200*a* according to the present releasing mechanism. FIG. 9A illustrates that the bail 100*a* is in the neutral position, the initial position, while FIG. 9B illustrates that, by pressing down the front end 206*a* of the actuator 200*a*, the rotation of the bail 100*a* is caused.

As shown in FIG. 9A, the first portion 105*a* of the cam 105 is in contact with the inner sliding surface 202*a* of the actuator 200*a* in the neutral position. Further, the head structure 104*a* of the bail 100*a* is in contact with the outer sliding surface 201*a*. Under the position mentioned above, the body portion of the actuator 200*a* is in the highest position, while the hook 203*a* provided in the tip of the arm portion positioned opposite thereto by putting the rotation center 207*a* of the actuator 200*a* is in the lowest position and this hook 203*a* engages with an opening formed in the cage. The stopper projection 111*a* within the opening 103*a* is in contact with the side of the cut portion of the axial projection 307*a*, and one side of the leg portion 102*a* is also in contact with the side of the rib 314. Moreover, the tab 12 extending from the front bottom of the transceiver supports the actuator 200*a* in its bottom surface.

In FIG. 9B, pressing down the front end 206*a* of the actuator 200*a*, a moment is caused to press the contact point of the tip of the head structure 104*a* to the outer sliding surface 201*a* downward. Its strength depends on the length from the rotation center of the actuator 200*a* to the front end 206*a* thereof and that to the contact point. The downward force operated in the contact point also acts as an angular moment for the bail 100*a* to rotate it.

In the first embodiment, since the actuator 200 is put between the cam 105 and the sliding projection 104, even if the front end 206 is pressed down, it is hard to convert the downward force affected thereto into the up-and-down motion of the actuator 200. Accordingly, the bail 100 operates as a stopper for the up-and-down motion of the actuator, which prevent the hook 203 provided in the tip of the arm portion 205 of the actuator 200 from pulling within the transceiver.

On the other hand in the present embodiment, the force applied to the front end 206*a* of the actuator 200*a* causes the rotation of the bail 100*a*, which enables the hook 203*a* in the tip of the arm portion 205*a* to be pulled within the transceiver by the seesaw motion of the actuator 200*a* with the support portion 207*a* as the center of the motion.

As shown in FIG. 9A, when the pluggable transceiver of the present invention is installed within the host system in high-density, it is supposed that, when the bail 100*a* is in the neutral position, the grips 107*a* and 110*a* in the bail 100*a* can not be touched due to the existence of neighbor transceivers, in this case just above the target transceiver. In such situation, a special tool may be necessary to rotate the bail 100*a*.

On the other hand, pressing down the front end 206*a* of the actuator 200*a*, just above the front end 206*a* forms the optical receptacles that is widely opened. Accordingly, no special tool is necessary to press down the front end 206*a*.

FIG. 10 is a perspective diagram of a bail 100*b* according to still further modification of the invention. The bail 100*b* according to this embodiment is made of metal and has a similar shape to those of the second embodiment. However, the head structure 104*a* of the end of the leg portion 102*a* is offset from the primary surface of the leg portion 102*a* in the previous embodiment, the bail 100*b* has a flat surface in the head structure 104*b* and the primary surface of the leg portion 102*b*. Accordingly, the bail 100*b* may be disassembled from the axial projection 307*b* of the receptacle portion 300 when the front end is pressed down.

As a preventing structure for the disassembling, the bail 100b of the present embodiment has a bridge portion 101b with an arced shape to increase a engaging force of the bail 100b with the receptacle portion 300b. Even the stress by pressing the front end 206b downward is affected to the bail 100b via the head structure 104b, the bail 100b does not disassemble from the receptacle member 300b.

On the center of the bridge portion 101b is provided with a tab 112b bent inside and with a projection 106b in the tip thereof. This projection 106b, as shown in FIG. 13, abuts against the top surface of the center partition 306b of the receptacle member 300b when the bail 100b is in the initial position, namely, the top position. The resilient force caused by bending the tab 112b presses the upper surface 306b, which keeps the initial position of the bail 100b. In first and second embodiments, a projection is provided in the bail, 100 or 100a, while the receptacle member, 300 or 300a, forms a dimple, and to engage the projection with dimple controls the initial position of the bail, 100 or 100a. The bent tab 112b and the projection 106b can exhibit the same function.

FIG. 11A and FIG. 11B show the rotation of the bail 100b and the up-and-down motion of the actuator 200b according to the present embodiment. In FIG. 11A, the bail 100b is in the initial position. That is, the side of the bail 100b abuts against the side of the rib 314b in the receptacle member 300b, at the same time, the stopper projection 111b formed within the opening 103b abuts against the side formed in the axial projection 307b of the receptacle member 300b. In this position, the bail 100b holds the actuator 200b by putting the inner and outer sliding surfaces, 202b and 201b, between the first portion 105b of the cam and the head structure 104b of the bail 100b. Since the head structure 104b is formed in arcuate as a portion of it protrudes to be in contact with the outer sliding surface 201b of the actuator 200b, which secures the smooth sliding between the head structure 104b and the outer sliding surface 201b. The actuator 200b positions the front end 206b thereof in the highest when the bail 100b is in the initial position, which protrudes the hook 203b provided in the tip of the arm portion 205b in the outermost by the seesaw motion to engage with the opening in the cage.

Rotating the bail 100b until the position shown in FIG. 11B, the inner and the outer sliding surfaces, 201b and 202b, are released from the cam 105b and the head structure 104b. At this position, the portion of the cam 105c is in contact with the inner sliding surface 202b of the actuator 200b, and this portion 105c has a greater radius than that of the initial position, shown in FIG. 11A, accordingly, the inner sliding surface 202b is pushed down. In this case, since the head structure 104b is apart from the outer sliding surface 201b, the actuator 200b may be disassembled from the receptacle member 300b. However, as shown in FIG. 7A, since the transceiver 11 provides the tab 12 in the front bottom thereof, which supports the actuator 200b from the bottom, the actuator 200b is not disassembled from the receptacle member 300b.

Moreover, as shown in FIG. 11B, to prevent the tip of the leg portion 102b from abutting against the rib 314b, a lower portion of the rib 314 is cut to slide the tip of the leg portion 102b in smooth. Even further rotating the bail 100b from the position shown in FIG. 11B, the stopper projection 111b abuts against the side of the axial projection 307b to control the rotation of the bail 100b. Thus, it is forbidden to rotate in further the bail 100b from the position shown in FIG. 11B.

In the present embodiment, as shown in from FIG. 11A to FIG. 12, the center partition 306b of the receptacle member 300b is gouged out. This facilitates the extraction of the transceiver 11 from the cage as the bail 100b rotates to the releasing position shown in FIG. 11B by putting a finger between the cut portion 306b and the bridge portion 101b. Also in the present embodiment, to press the front end 206b of the actuator 200b downward at the initial position shown in FIG. 11A can be converted into the rotation of the bail 100b, thereby pulling the hook 203b within the transceiver 11 to release the engagement with the cage as shown in FIG. 11B. At this position, the transceiver 11 can be extracted from the cage by putting a finger between the receptacle member 300b and the bridge portion 101b and pulling the bridge portion 101b.

Thus, the present embodiment and previously explained embodiments may provide the pluggable transceiver 11 with the structure facilitating the release of the latching mechanism with the cage and extraction of the transceiver therefrom.

What is claimed is:

1. A pluggable transceiver to be inserted into and latched with a cage provided in a host system, comprising:
   a receptacle member having a pair of sides and a center partition, said pair of sides each providing axial projection;
   a bail, attached to said receptacle member, having a pair of leg portions and a bridge portion connecting said leg portions, each leg portion having an opening to receive said axial projection provided in said receptacle member such that said bail rotates with said axial projection as a center of rotation; and
   an actuator having an arm portion, a support portion, and a body portion, said arm portion and said body portion capable of moving in seesaw motion with said support portion as a pivot of said motion, said arm portion providing a hook in an end portion thereof to engage with said cage,
   wherein said bail has a cam for converting said rotation of said bail into said seesaw motion of said actuator to release said hook from said cage.

2. The pluggable transceiver according to claim 1, wherein said actuator provides an inner sliding surface and an outer sliding surface, said cam being in contact to said inner sliding surface.

3. The pluggable transceiver according to claim 2, wherein said leg portion of said bail has a sliding projection in an end portion thereof, said sliding projection being in contact to said outer sliding surface of said actuator.

4. The pluggable transceiver according to claim 3, wherein said sliding projection and said cam of said leg portion put said actuator therebetween.

5. The pluggable transceiver according to claim 3, wherein said leg portion of said bail has a primary surface including said opening and a secondary surface including said sliding projection, said primary surface and said secondary surface being offset to each other.

6. The pluggable transceiver according to claim 1, wherein said cam has a first portion, a second portion, and a third portion, said second portion being substantially linear, and said third portion having a distance to said center of rotation of said bail greater than a distance of said first portion to said center of rotation of said bail.

7. The pluggable transceiver according to claim 6, wherein said first portion of said cam is in contact to said inner sliding surface of said actuator and said second portion of said cam makes an predefined angle to said inner sliding surface when said hook provided in said arm portion engages with said cage.

8. The pluggable transceiver according to claim 7, wherein said actuator does not start said seesaw motion until said bail rotates by said predefined angle.

9. The pluggable transceiver according to claim 1,
wherein said axial projection provided in said receptacle member has a shape including two circles concentric to each other with a portion of said outer circle being cut to expose said inner circle, and
wherein said opening provided in said leg portion has a stopper projection in an edge thereof, said stopper projection being received in and abutting against said cut portion of said axial projection of said receptacle member to control said rotation of said bail.

10. The pluggable transceiver according to claim 1, wherein said receptacle member has a rib in said side thereof, said leg portion of said bail abutting against said rib to control said rotation of said bail.

11. The pluggable transceiver according to claim 1, wherein said actuator causes said rotation of said bail by pressing a front end of said actuator downward.

12. The pluggable transceiver according to claim 1, further comprises a cover providing a tab in a front bottom thereof to support said actuator.

13. The pluggable transceiver according to claim 1, wherein said bridge portion of said bail has a convex shape warping to a direction opposite to a space sandwiched by said pair of leg portions.

14. The pluggable transceiver according to claim 1, wherein said center partition of said receptacle member provides a axial projection, and said bridge portion of said bail provides a dimple to receive said axial projection of said center partition of said receptacle member.

15. The pluggable transceiver according to claim 1, wherein said bridge portion of said bail provides a projection in a surface facing said center partition of said receptacle member.

16. The pluggable transceiver according to claim 15, wherein said center partition of said receptacle member provides a dimple to receive said projection formed in said bridge portion of said bail.

17. The pluggable transceiver according to claim 1, wherein said center partition is gouged out in an upper portion thereof.

18. The pluggable transceiver according to claim 1, wherein said receptacle member and said actuator are formed by molding resin.

* * * * *